Nov. 13, 1962  L. E. HANKISON ET AL  3,063,259
APPARATUS FOR FILTERING AND DEHYDRATING GASES
Filed Nov. 14, 1960  3 Sheets-Sheet 1

INVENTORS
LEWIS E. HANKISON
WILLIAM FOSTER WALKER
BY Hoops, Leonard & Buell
their ATTORNEYS Nov. 13, 1962    L. E. HANKISON ET AL    3,063,259
APPARATUS FOR FILTERING AND DEHYDRATING GASES
Filed Nov. 14, 1960    3 Sheets-Sheet 2

INVENTORS
LEWIS E. HANKISON
WILLIAM FOSTER WALKER

BY Hoopes, Leonard & Buell
their ATTORNEYS

Nov. 13, 1962    L. E. HANKISON ET AL    3,063,259
APPARATUS FOR FILTERING AND DEHYDRATING GASES
Filed Nov. 14, 1960    3 Sheets-Sheet 3

INVENTORS
LEWIS E. HANKISON
WILLIAM FOSTER WALKER

BY Hoopes, Leonard & Buell their ATTORNEYS

United States Patent Office 3,063,259
Patented Nov. 13, 1962

3,063,259
APPARATUS FOR FILTERING AND DEHYDRATING GASES
Lewis E. Hankison, Pittsburgh, and William Foster Walker, Bethel, Pa., assignors to Hankison Corporation, a corporation of Pennsylvania
Filed Nov. 14, 1960, Ser. No. 68,941
8 Claims. (Cl. 62—317)

This invention relates to apparatus for filtering and dehydrating gases and, more particularly, to apparatus for removing water, oil and other fluids and solids from compressed air or other compressed gas. Further, apparatus of this invention may be relatively readily disassembled for maintenance and for reassembly.

Devices of this invention include heat exchange and cooling features which are markedly superior to prior practices. Thus, the present invention is an improvement in a number of respects upon the embodiment illustrated in United States Patent No. 2,790,507 owned by the assignee of the present invention. The invention described and claimed herein provides for very efficient and relatively fast heat exchange, cooling of the compressed air or gas being cleaned to condense moisture therein without freezing such moisture, and filtering the dried air or gas before discharging it clean, that is minus the condensibles and solids, at a temperature which may be almost as great as its inlet temperature, if desired. A device of the present invention still further comprises a pressure vessel which is readily capable of being made up with interchangeable components which can be put together and taken apart with separable gas-tight joints and relatively easily for both set-up and maintenance purposes. At the same time, such device of this invention is a sound single pressure vessel from which the liquefied condensibles are periodically discharged without significant loss of the air or gas under pressure within the vessel. The high "instrument-air" quality of compressed gas cleaned and dried by devices of this invention make such gas particularly suitable for use in instrumentation and automation systems.

Other objects, features and advantages of this invention will be apparent further from the following description and the accompanying drawings, which are illustrative of one embodiment only, in which—

FIGURE 4 is a view in section taken along line IV—IV of FIGURE 1;

FIGURE 5 is a view taken along line V—V of FIGURE 4;

Figure 1:
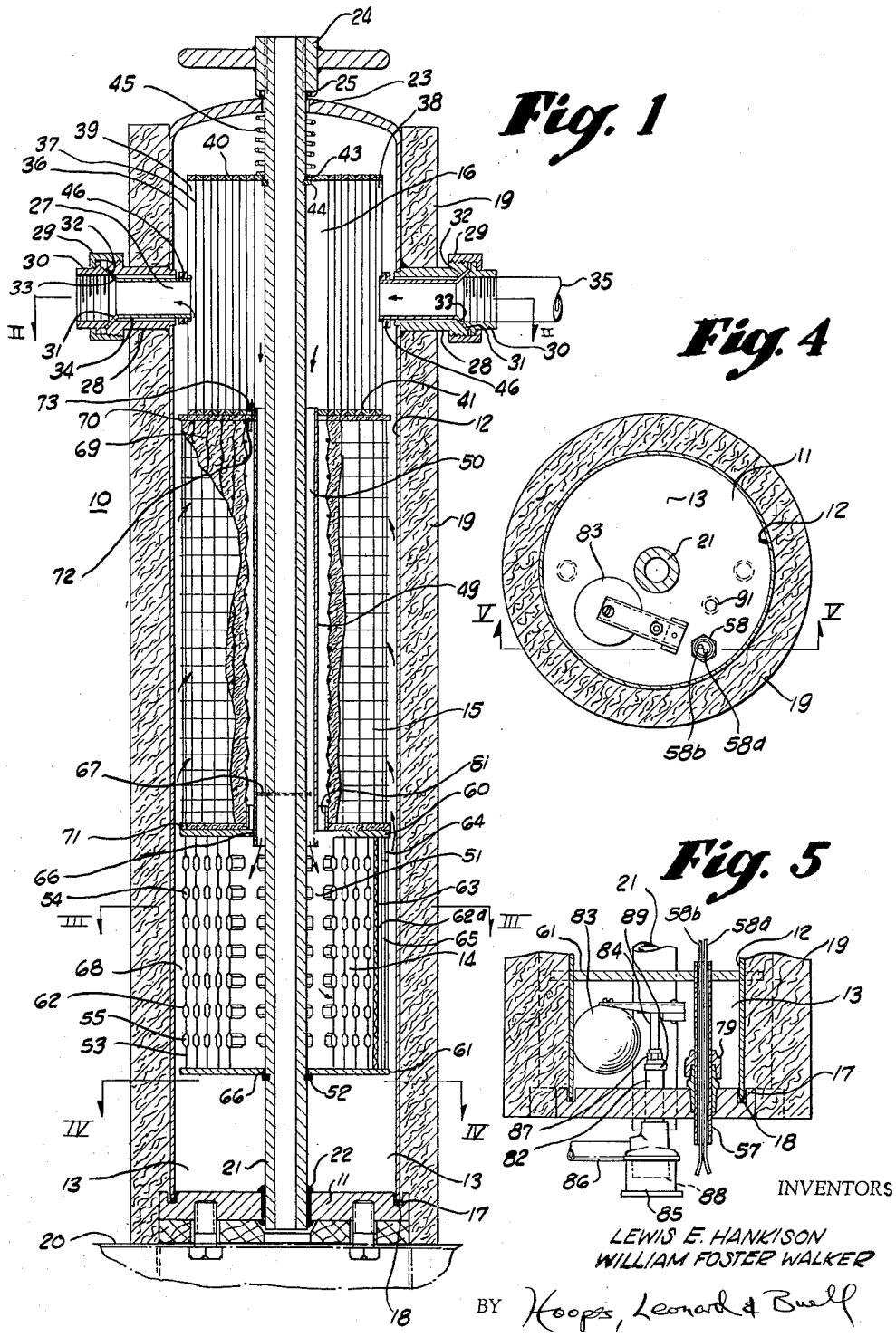
FIGURE 1 is a view in elevation and cross-section through the axis of one embodiment of our invention.
Figure 2:
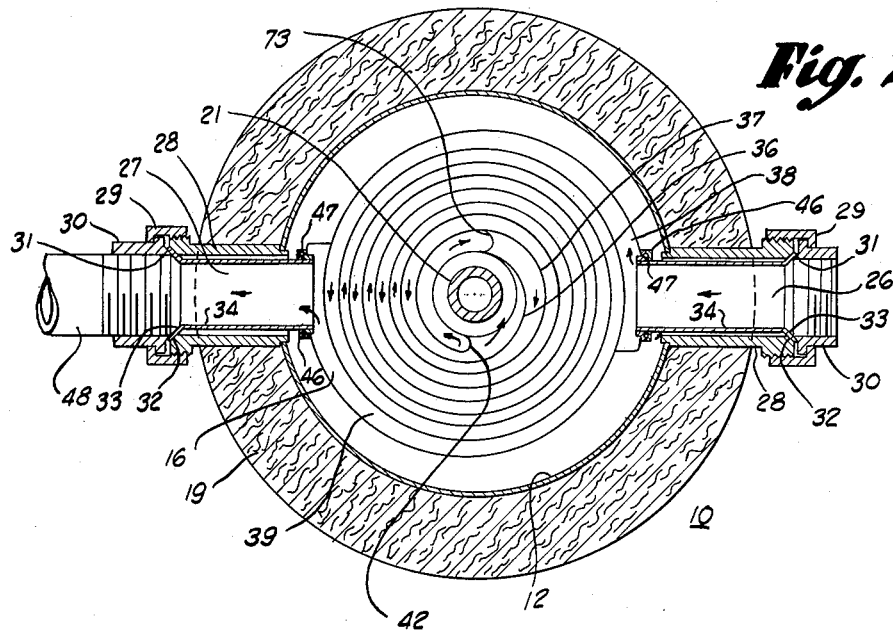
FIGURE 2 is a view in section taken along line II—II of FIGURE 1.

Referring to the drawings, the device 10 shown therein comprises one embodiment of this invention in the form of a dehydrating and filtering apparatus having an annular base 11 and a shell casing 12 enclosing a drainage section 13, a condenser-evaporator section 14, a filter section 15 and a heat exchange section 16 in superimposed coaxial relation. The bottom edge of casing 12 seats in a groove 17 which has an O-ring 18 at the bottom thereof to maintain the interior of casing 12 at the pressure of the compressed air or other compressed gas being treated by apparatus 10. Optionally, the exterior of casing 12 may be lagged by insulating material 19 to avoid heat exchange with the outside ambient atmosphere. Base 11 may be bolted to a refrigeration cabinet 20 which supplies a cooled refrigerant to cooling section 14 to condense condensibles in such gas in the course of drying it.

Figure 3:
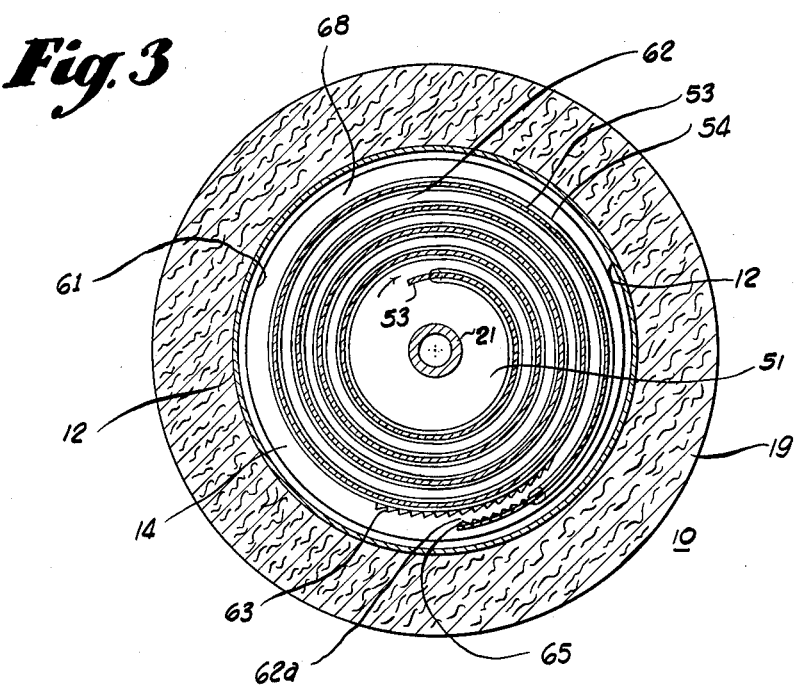
FIGURE 3 is a view in section through the cooling section of the embodiment shown in FIGURE 1 taken along line III—III of that figure.
Figure 7:
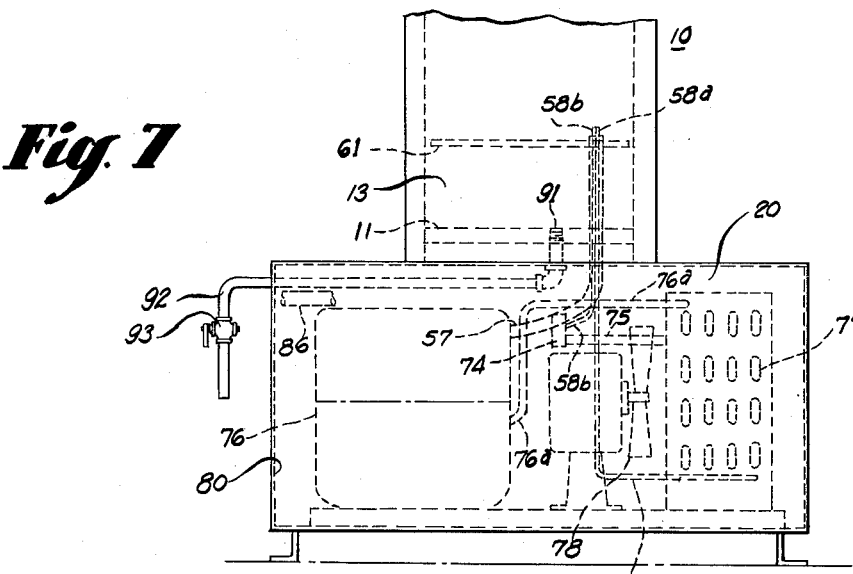
FIGURE 7 is a view in elevation of a stand for the device of FIGURE 1 incorporating a regulatable refrigeration unit which cooperates with the cooling section of the foregoing embodiment.

A central shaft 21, which may be hollow if desired, is fixed to base 11 at one end as by welding 22 and extends through an opening 23 at the other end in the top of casing 12. The uper end of shaft 21 is threaded for engagement by a nut 24, the lower end of which is provided with an O-ring 25 so that when nut 24 is tightened, the opening 23 around shaft 21 will be sealed, preserving the integrity of the pressure inside casing 12. Casing 12 is provided with an inlet opening 26 for gas to be treated and an outlet opening 27 for such gas after it has been cleaned and dried. Each opening 26 has a cylindrical coupling 28 welded to the edge of the opening and extending outwardly therefrom. A union 29 is provided at the outer end of each coupling in the form of a ferrule nut 29 and a seal fitting 30. The inner end of seal fitting 30 is tapered at 31 to match the outward flare 32 on the body of coupling 28 so that as nut 29 is tightened, the surfaces 31 and 32 will bind and seal against the outer flared end 33 of a cylindrical liner 34 used respectively for the conduct of compressed gas to the interior of device 10 and for the discharge of clean, dry compressed gas from such interior, respectively, such flow being indicated by the arrows shown in FIGURES 1 and 3. The outer end of each fitting 30 is provided with a female pipe thread to engage a respective pipe, the pipe 35 shown in FIGURE 1 representing a pipe leading raw compressed gas from the compressor into apparatus 10 from which condensibles and any solids are to be removed.

Heat exchange section 16 is a horizontal spiral formed by rolling laterally spaced walls 36 and 37 made of a thin flexible metal preferably of good heat conductive metal such as brass into a double volute form with the walls during the rolling remaining spaced to define a spiral inlet passage 38 and a spiral outlet passage 39. Those passages are not in communication with one another between the level of the annular top 40 and the annular bottom 41 of section 16 because of the reverse bend 42 at the inner end of the spaced walls. If desired, the spacing between the walls and during rolling may be provided for by the use of a flexible wire of suitable diameter used at the upper and lower edges of the walls and soldered or brazed thereto, thereby forming such annular top 40 and bottom 41 and closing the top and bottom of section 16. Top central opening 43 rests upon a snap ring support 44 in shaft 21 and is sealed around opening 43 by a ring seal which flexibly engages the outside of the shaft 21. In the assembled device 10, spring 45 is under compression between the underside of casing 12 and top 40 of section 16 to bias the sections toward one another and together and to assist in holding them in assembled coaxial relation.

The outside of inlet passage 38 is provided with an opening to the edge of which a cylindrical flange 46 is affixed. Flange 46 has an O-ring 47 to engage and seal the outside of liner 34 when the inner end thereof is pushed into flange 46, thereby providing a sealed connection between the interior of pipe 35 and passage 38. Similarly, the outer end of outlet passage 39 is provided with a cylindrical flange and seal for the inner end of the outlet liner 34. Hence, as the raw compressed air or gas moves through the spiral passage 38 it will deliver up heat to the clean dried compressed air or gas flowing in the opposite countercurrent spiral direction in outlet passage 39. It has been found that the clean compressed gas exiting through pipe 48 from apparatus 10 will be virtually free of condensibles and any solids and, if desired, at a temperature relatively close to the inlet temperature. The heat exchange efficiency through the heat conductive walls 36 and 37 of section 16 is high and reflects the very compact, efficient nature of section 16.

The incoming gas to be treated leaves section 16 cooler and through a depending tube 49 in the center welded to the central opening in bottom 41 around a substantial portion of the circumference of the tube 49, the remainder of that circumference being sealed to wall 36 for the remaining distance from return bend 42. Hence, all of the compressed gas leaving the passage 38 must flow down through an annular space 50 between shaft 21 and the inside of tube 49 for discharge into the center 51 of section 14 which is supported on a support ring 52 secured to shaft 21 in selectively spaced position above base 11.

Figure 6:
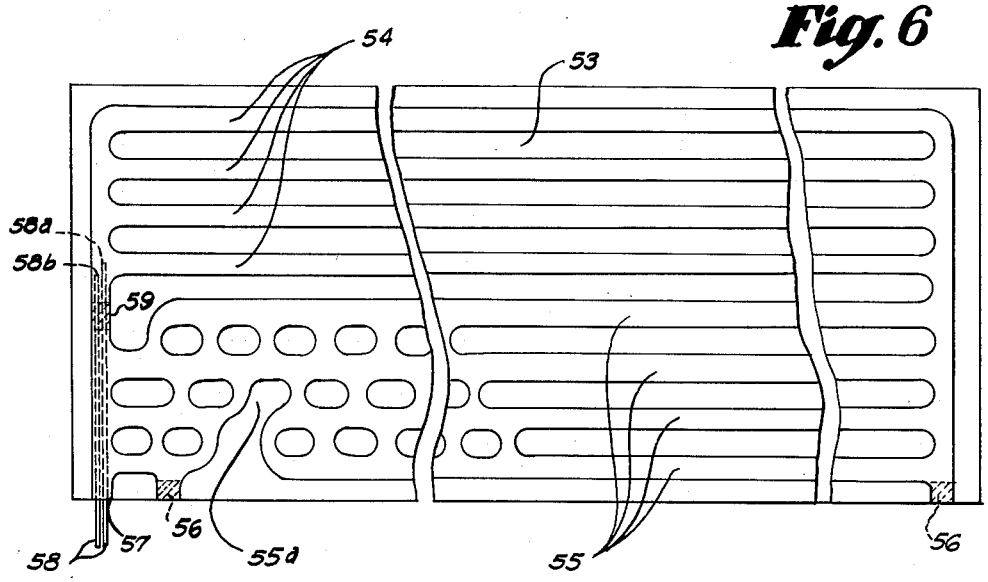
FIGURE 6 is a developed view in elevation of one form of the cooling section wall shown in FIGURES 1 and 3.

Section 14 includes a single horizontal spiral passage with a single wall 53, which may be made of a material such as "Roll-Bond" to provide horizontal refrigerant passages 54 and return passages 55 within the wall itself, which return passages in the illustrated embodiment are in the lower portion of the wall. Plugs 56 are utilized to force the returning refrigerant, which may be a material such as a suitable "Freon," to return through tube 57 around the outside of capillary tubes 58, the upper ends of which extend through a seal plug 59 at the entrance to the passages 54. The top and bottom of the continuous spiral passage 62 for the compressed gas between turns of wall 53 are closed by annular top plate 60 and annular bottom plate 61 brazed or soldered to the respective top and bottom edges of the wall 53, shown in FIGURE 6 in developed (unrolled) shape.

In the neighborhood of the outer end 62a of the passage, the passage walls preferably are lined with reticulated mesh 63 in accordance with the disclosure in United States patent application Serial No. 760,490 filed September 11, 1958, and in common ownership with the instant invention. Such outer end of the cooling section passage may also be provided with a short dip baffle 64 at the top thereof and an intermediate collector lip 65 as also disclosed in such application. O-ring seals 66 around the inner edge of the top and bottom plates 60 and 61 bear against the outside of depending tube 49 and shaft 21, respectively, and maintain the flow path integrity of the gas being treated as it passes into and flows outwardly through the spiral passage in section 14 where the condensibles therein such as water, oil and possibly others, are condensed and drain along the bottom of the spiral passage spilling out over the edge of bottom 61 into drainage compartment 13. The lower end of tube 49 is guided and spaced by the central opening in plate 60, and, further, equilaterally spaced radially outwardly projecting pins 67 in shaft 21 may be utilized, the inside of such tube 49 sliding over the outer end of such pins when assembled in place.

The dried compressed gas exiting from section 14 rises in the annular space 68 and flows against the extensive outside surface of filter section 15, in which the filtering may be done by a material such as Canton flannel covering an annular zig-zag or star-shaped frame of hardware cloth 69. Annular gaskets 70 and 71 provide the closure top and bottom of filter section 15 and engage the sections 16 and 14 respectively in tight relation to control the flow path of the treated gas. Top plate 60 is also provided with a cylindrical guide flange 81 for coaxial centering of filter section 15. In the filter section 15, any solids entrained in the compressed air or gas are removed as the gas passes to the inside of the filter around the outside of tube 49, such gas rising through an arcuate opening 72 in top 70 and a registering arcuate opening 73 in bottom 41 of section 16, such latter arcuate opening extending between the sides of a portion of the innermost turn of passage 39. Thus, through openings 72 and 73, the dried and cleaned compressed gas enters the inner end of outlet passage 39 to pick up heat from the incoming raw gas and thereby reduce the load on the cooling section 14 and regulate, to the desired extent, the temperature of the compressed gas leaving apparatus 10.

Refrigerant in cooled expandable form enters the passages 54 from the end 58a of one of the capillary tubes 58 and as the refrigerant expands within the refrigerant spaces in wall 53, it cools and condenses the vapors in the compressed gas flowing through spiral passage 62 in section 14 between the walls 53. The refrigerant returns as a gas to the refrigeration unit in cabinet 20 through pipe 57 around which a stuffing box 79 seals the opening through base 11 for that return pipe 57. The other capillary 58b which extends through pipe 57 regulates a pressure responsive "hot" gas by-pass valve 74 in a by-pass line 75 between a compressor 76 and a radiator 77 cooled by a fan 78. Thus in operation, the gasified refrigerant returns through pipe 57 in which it sweeps the outside of the capillary tubes 58 and passes to compressor 76 from which it is delivered through pipe 76a to the condensing radiator 77. The refrigerant in pipe 76a entering the radiator is in gasified form at higher temperature and pressure than the refrigerant entering the compressor. The radiator 77 is provided with coils and cooled by a flow of air thereover produced by the motor driven fan 78; the ends 80 of cabinet 20 being open and screened for ready ambient air access and flow through the cabinet. The refrigerant which passes through radiator 77 is liquefied and discharged from the radiator through capillary tube 58a, which conducts it to the expansion refrigeration space provided by the passages within wall 53. The flow of liquid refrigerant to the refrigeration space is automatically controlled in accordance with the pressure exerted through capillary tube 58b upon a diaphragm in the hot gas by-pass valve 74. Valve 74 is a proportioning valve which operates between a fully closed position and a predetermined open position. Upon an opening of valve 74 responsive to the aforesaid pressure in the capillary 58b, refrigerant gas leaving compressor 76 is by-passed before it passes through radiator 77 and returned through by-pass pipe 75 to the inlet pipe 57 leading into compressor 76. As the valve 74 is opened wider by a pressure change in tube 58b in one direction, a correspondingly greater quantity of refrigerant gas is so by-passed, and vice versa, to maintain the pressure in the refrigeration space relatively uniform regardless of changes in the load to remove condensibles in the compressed air or other gas being treated in section 14. Since some liquid refrigerant will be delivered to the expansion refrigeration space even under the lightest loads, it will be noted that an accumulator space portion is provided in the two lowermost return passages 55 to the right of the dam 55a in FIGURE 6 where such refrigerant supply will be available upon an increase in the refrigeration load imposed upon cooling section 14. Further, the condensibles remain liquid and do not freeze upon wall 53 irrespective of variations in the ambient temperature, rate of compressed gas treated, or vapor volume therein, within the capacity of the selected apparatus.

Compartment 13 is provided with a snap action magnetic attraction trap 82 extending through an opening in base 11 and having a float 83, a valve stem 84, a main valve 89, and a main valve operator cylinder 85 plus a liquid discharge line 86. Valve stem 84 is in two parts connected together by a union joint 87 to enable it to be broken at the joint and taken laterally out of compartment 13 when casing 12 is removed without removing section 14 because of the firm sealed communication connections of return tube 57 and capillaries 58 respectively to the refrigerant passages in wall 53. When the accumulated condensed liquid in compartment 13 rises high enough to cause a snap action rise of float 83, a piston 88 in cylinder 85 is actuated to open the main valve 89 and instantly drain the compartment to the level of the main valve seat whereupon the trap, which is in accordance with the disclosure of United States patent application Serial No. 627,899 filed December 12, 1956, in common ownership with this application, closes with a snap action. Compartment 13 is also provided with a tapped opening 91 in the bottom thereof to which a pipe 92 having a petcock 83 therein is connected for occasional blowdown purposes if and when desired.

The operation of apparatus 10 appears in the foregoing and although that illustrated embodiment includes a filter section, it will be apparent that advantages of this invention will be obtained in apparatus employing the teachings of the instant invention even when a filter section is omitted as in the case when the gas being treated is virtually free of entrained solids, or such entrained solids present no significant problem. Still further, novel features of the heat exchange section and/or of the condenser-evaporator section may be separately availed of in subscombinative devices within the foregoing disclosure. Various other changes may be made in the illustrated embodiment and other embodiments provided without departing from the spirit of our invention or the scope of the appended claims.

We claim:

1. Apparatus for filtering and dehydrating compressed gas, comprising, in combination, a base, a shell casing for said base, a central shaft operatively fixed to said base and extending through the top of said casing, means for pressing said casing against said base and making the interior thereof gas-tight, an annular condenser section of horizontal spiral shape having a wall with horizontally extending refrigerant passages therein, said wall being wound in radially spaced relation to define a continuous spiral horizontal passage, reticulated mesh means in the neighborhood of the outer end of said passage for removing entrained liquids from gas dried in passing through said passage, annular top and bottom plates for said condenser section, means for supporting said condenser section spaced above said base to define a condensed liquid trap and drainage chamber below said condenser section, an annular filter of relatively large surface with annular heads at the respective top and bottom thereof supported upon the top plate of said condenser section, a horizontal double volute spiral heat exchange section positioned on top of said filter section, said heat exchange section having relatively thin spaced heat exchange walls of flexible metal defining internested inlet and outlet spiral passages for heat exchange through said walls, an inlet opening at the outer end of the inlet passage, a heat exchanger tube in communication connection with the inner end of said inlet passage and extending downwardly through said filter section into the top of the inside of said annular condenser section, said outlet passage having an inlet opening on the bottom at its inner end adjacent the outside of said tube for dried filtered air entering from the center of said filter section and an outlet opening at the outer end of said outlet passage, said openings in said heat exchanger section having cylindrical flanges, said casing having coaxial gas connection coupling bodies fixed thereto with removable coupling portions at the outer end thereof, and removable connecting lining tubes extending between said cylindrical flanges and said couplings respectively, said flanges and couplings having sealing means for said lining tubes to seal against escape of gas passing therethrough, means for supporting said condenser and heat exchange sections in position on said central shaft with said filter section between them and biasing said sections toward said base when said casing is secured in position on said base, means for sealing and guiding said respective sections to provide a predetermined path for gases through said sections, and regulatable refrigerant circulation means beneath said base for controlling the cooling in said condenser section.

2. Apparatus as set forth in claim 1, having an automatic trap in said drainage chamber for periodically discharging liquified condensibles from said chamber, and means for regulating the refrigerant circulated to the refrigerant passages in said condenser section to maintain said liquified condensibles in liquid form.

3. Apparatus for filtering and dehydrating compressed gas, comprising, in combination, a base, a shell casing for said base, a central shaft extending through said apparatus and the top of said casing, means for holding said casing against said base to make the interior thereof gas-tight, an annular condenser section of horizontal spiral shape having a wall with refrigerant passages therein, said wall being wound in radially spaced relation to define a continuous spiral horizontal passage, annular top and bottom plates for said condenser section, means for supporting said condenser section spaced above said base to define a condensed liquid drainage chamber below said condenser section, means for discharging accumulated condensed liquid from said chamber, an annular filter of relatively large surface with annular heads at the respective top and bottom thereof supported upon the top plates of said condenser section, a horizontal double volute spiral heat exchange section positioned on top of said filter section, said heat exchange section having walls defining internested inlet and outlet spiral passages for heat exchange through said walls, an inlet opening at the outer end of the inlet passage, a heat exchanger tube in communication connection with the inner end of said inlet passage and extending downwardly through said filter section into the top of the inside of said annular condenser section, said outlet passage having an inlet opening on the bottom at its inner end adjacent the outside of said tube for dried filtered air entering from the center of said filter section and an outlet opening at the outer end of said outlet passage, said openings in said heat exchanger section having cylindrical flanges, said casing having coaxial gas connection coupling bodies fixed thereto with removable coupling portions at the outer end thereof, and removable connecting lining tubes extending between said cylindrical flanges and said couplings respectively, said flanges and couplings having sealing means for said lining tubes to seal against escape of gas passing therethrough, means for supporting said condenser and heat exchange sections in position on said central shaft with said filter section between them and refrigerant circulation means connected to said apparatus for cooling said condenser section.

4. Apparatus as set forth in claim 3, in which said cylindrical flanges are provided with an O-ring seal around the inside thereof, said coupling body is provided with a flaring seat at the outer end thereof, said coupling portion is entirely removable from said coupling body and is provided with a tapered mating face at the inner end thereof to cooperate with said seat, said connecting lining tube is straight at its inner end for push-pull sealed attachment to and detachment from said cylindrical flange respectively, said connecting lining tube having a flared outer end to be bound in sealed relation by said coupling body and portion between said seat and face, and having a nut to bind said coupling portion to said body when said connecting lining tube is in place, and means for attaching a gas conducting pipe to said coupling portion.

5. Apparatus as set forth in claim 3, having a spring in compression between the top of said heat exchange section and the underside of said casing when said apparatus is closed to provide firm superposed coaxial respective engagement between said sections, at least said heat exchange and filter sections having central openings therethrough for the ready axial movement removal thereof by separation from said shaft when said casing is opened and removed from said shaft after said coupling portions have been detached and said connecting lining tubes removed from said cylindrical flanges.

6. Apparatus for filtering and dehydrating compressed gas, comprising, in combination, a pressure-tight casing to close said apparatus, a vertical member within said casing to removably support at least coaxial superposed heat exchange and filter sections, an annular condenser section with annular top and bottom plates having a wall in a horizontal spiral with a refrigerant passage therein, said wall being radially spaced to define a continuous spiral horizontal passage for said gas, an emptiable condensed liquid drainage chamber below said condenser section, a horizontal double volute spiral heat exchange section positioned in the upper part of said apparatus, an annular filter with annular heads at the respective top and bottom thereof supported between said condenser and said heat exchange sections, said heat exchange section having walls defining a pair of interfitting inlet and outlet spiral passages for heat exchange therebetween through said walls, a generally flush opening at the outer end of the inlet and outlet passages respectively, means for conducting incoming gas from the inner end of said inlet passage directly into the center of said condenser section at the inner end of the spiral passage therein, means for conducting gas leaving said condenser section on the outside thereof through said filter section from the outside to the inside thereof and into the inner end of said outlet passage, said casing having gas connection couplings, each said opening in said heat exchange section being in registry with one of said couplings, removable gas conducting liners extending through said couplings respectively, said heat exchange section and couplings having sealing portions to seal said conducting liners against escape of gas passing therethrough, and refrigerant means for automatically controlling the amount of cooling in said condenser section by circulating pressure regulated quantities of refrigerant through said condenser section.

7. Apparatus for filtering and dehydrating compressed gas, comprising, in combination, a removable pressure-tight casing for said apparatus, a condenser section having a wall in a horizontal spiral with a refrigerant circulation space within said wall and a continuous spiral horizontal passage for said gas between the spaced turns of said wall, means to remove liquid condensed in said condenser section from said apparatus, a horizontal double volute spiral removable heat exchange section positioned in the upper part of said apparatus, a removable filter positioned between said condenser and said heat exchange sections, said heat exchange section having walls defining a pair of interfitting inlet and outlet spiral passages for heat exchange therebetween through said walls, means adjacent the bottom of said heat exchange section for conducting incoming gas from the inner end of said inlet passage into the center of said condenser section, means for conducting gas leaving said condenser section on the outside thereof through said filter section from the outside to the inside thereof and into the inner end of said outlet passage adjacent the bottom of said heat exchange section, said casing having gas connection couplings, and removable sealed means cooperating with said couplings and extending across the space between said casing and heat exchange section for conducting gas directly to and from said inlet and outlet passages respectively.

8. Apparatus for cleaning gas, comprising, in combination, a removable casing for said apparatus, a condenser section having a wall in a horizontal spiral having a continuous spiral horizontal passage for said gas between the spaced turns of said wall and cooling means to condense liquefiable vapor in said gas, means to remove liquid condensed in said condenser section, a horizontal double volute spiral heat exchange section, said heat exchange section having walls defining a pair of interfitting inlet and outlet spiral passages for heat exchange therebetween through said walls, means for conducting incoming gas from the inner end of said inlet passage into the center of said condenser section, means for conducting gas leaving said condenser section on the outside thereof into the inner end of said outlet passage, said cooling means including a refrigerant compressor, radiator and evaporator, said evaporator comprising an expansion refrigeration space within said wall of said condenser section, means including a gas by-pass valve responsive to pressure in said refrigeration space to by-pass said radiator and recycle refrigerant leaving said compressor to said compressor for automatic regulation of the quantity of liquid refrigerant delivered to said refrigeration space from said radiator in accordance with the refrigeration load, said refrigeration space further having a refrigerant accumulator portion therein to hold variable quantities of said refrigerant in accordance with the operation of said means.

References Cited in the file of this patent
UNITED STATES PATENTS

| | | |
|---|---|---|
| 709,763 | Grumbacher | Sept. 23, 1902 |
| 1,505,743 | Stebbins | Aug. 9, 1924 |
| 2,142,679 | Seifert | Jan. 3, 1939 |
| 2,233,189 | Altenkirch | Feb. 25, 1941 |
| 2,234,753 | Frazer | Mar. 11, 1941 |
| 2,586,207 | Collins | Feb. 19, 1952 |
| 2,790,507 | Hankison | Apr. 30, 1957 |